INVENTOR.
CORNELIS & ARY VAN DER LELY

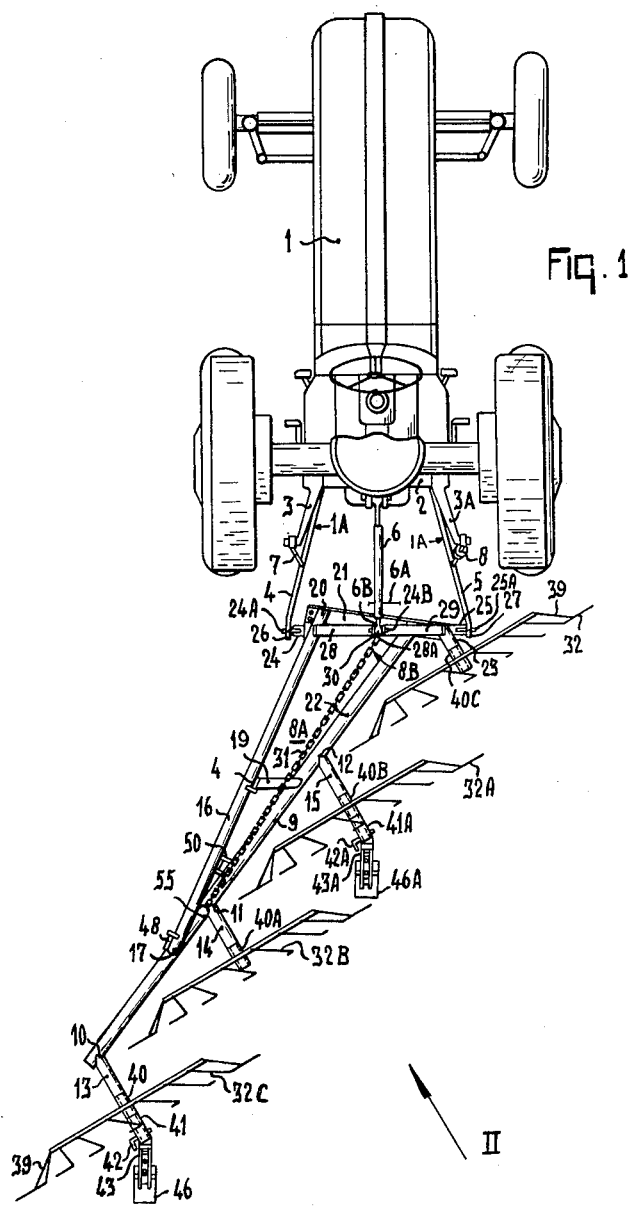

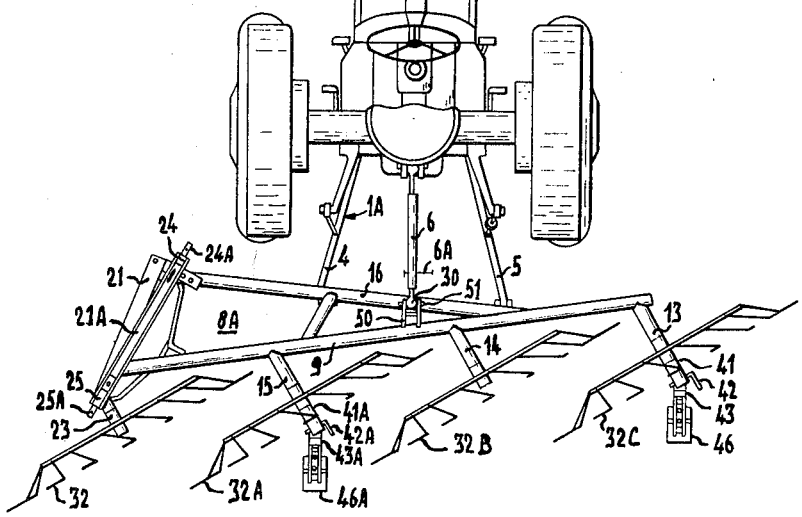
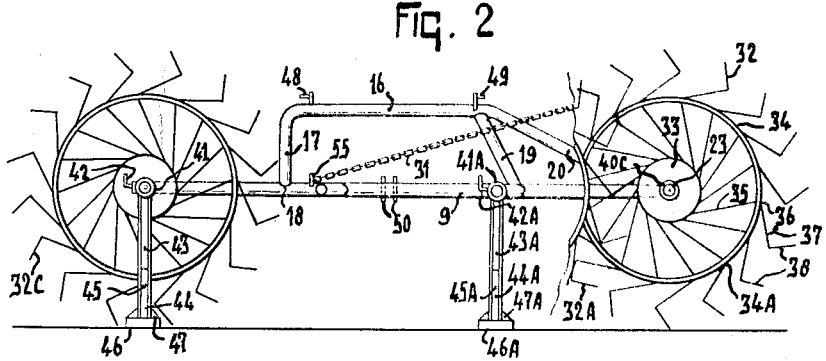

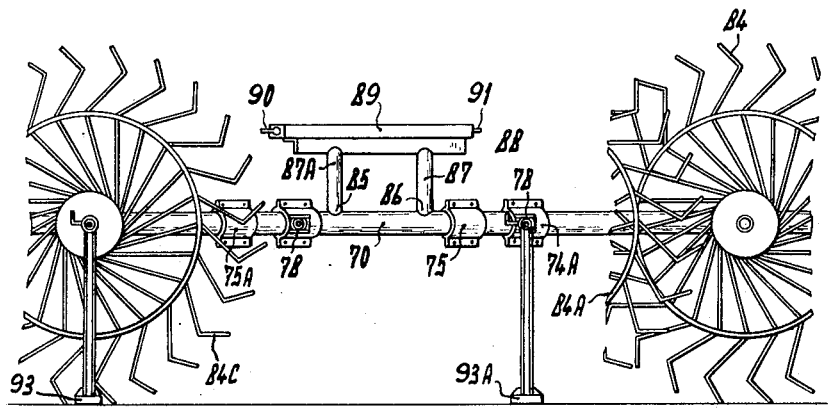

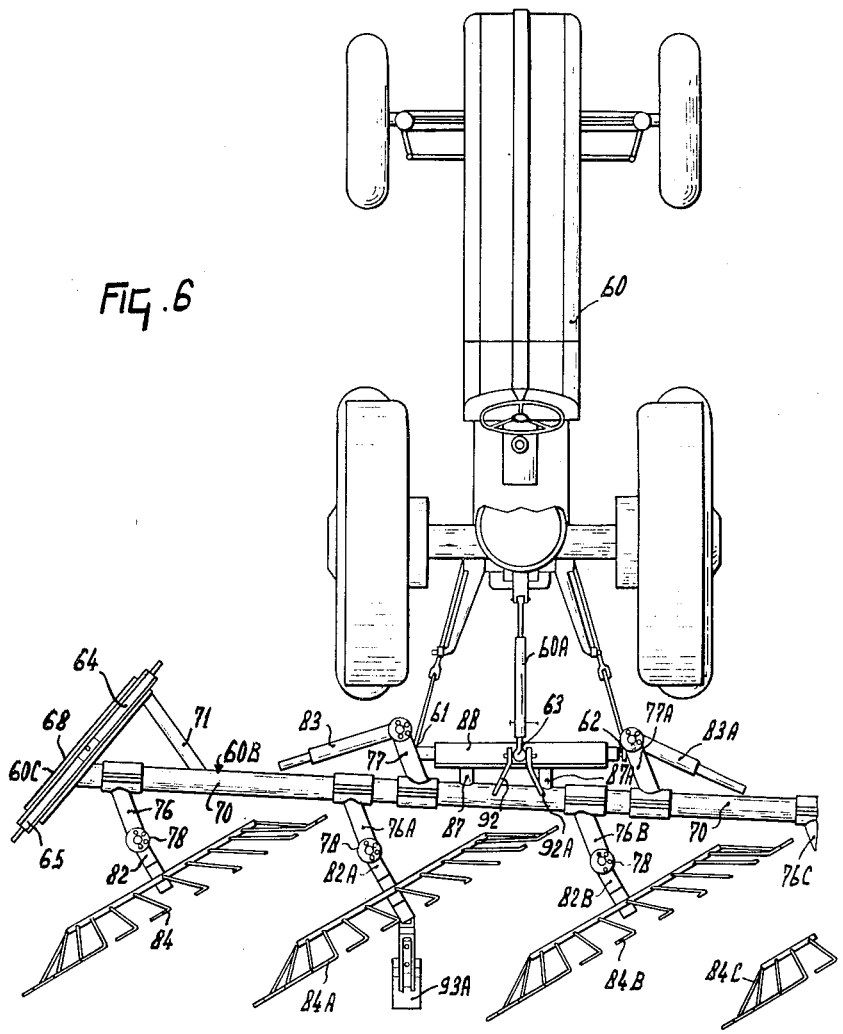

3,103,776
CONVERTIBLE SIDE DELIVERY RAKE
Cornelis van der Lely, Zug, Switzerland, and Ary van der Lely, Maasland, Netherlands, assignors to C. van der Lely N.V., Maasland, Netherlands, a Dutch limited-liability company
Original application Nov. 28, 1955, Ser. No. 549,482, now Patent No. 2,933,878, dated Apr. 26, 1960. Divided and this application Apr. 14, 1960, Ser. No. 22,246
10 Claims. (Cl. 56—366)

This invention relates to an implement which is convertible from a side delivery rake into a tedder, having a row of rake wheels in echelon which are obliquely arranged with regard to the intended direction of travel of the implement.

It is an object of the invention to provide an implement which can be conveniently and effectively converted from its side delivery raking position to a position wherein it operates as a tedder.

There is thus provided, according to the invention, a side delivery rake for laterally displacing material such as hay or other crops lying on the ground which comprises a frame, overlapping rake wheels mounted in echelon said frame, a side delivery fastening device connected at one end of said frame for attachment to the power lift mechanism of a tractor, a tedder fastening device connected intermediately on said frame also for attachment to the power lift mechanism of a tractor, each of said fastening devices incorporating at least two transversely spaced connecting points and serving to prevent movement of said frame in a lateral direction relative to the direction of movement of the device.

This is a division of our application Serial No. 549,482 to issue as Patent No. 2,933,878 on April 26, 1960.

In order that the invention may be clearly understood and readily carried into effect, reference will now be made, by way of example, to the accompanying drawings in which:

FIG. 1 shows a plan view of an implement attached to a tractor, the implement being in working position to serve as a side delivery rake;

FIG. 2 shows a side elevation of the implement when viewed in the direction of the arrow II in FIG. 1, with a portion of the implement cut away;

FIG. 3 shows a plan view of the implement in working position to serve as a tedder;

FIG. 5 shows a side elevation of the modified version when viewed in the direction of the arrow V in FIG. 4, part of the modified version having been removed; and FIG. 6 shows a plan view of the modified version in working position to serve as a tedder.

Figure 4:
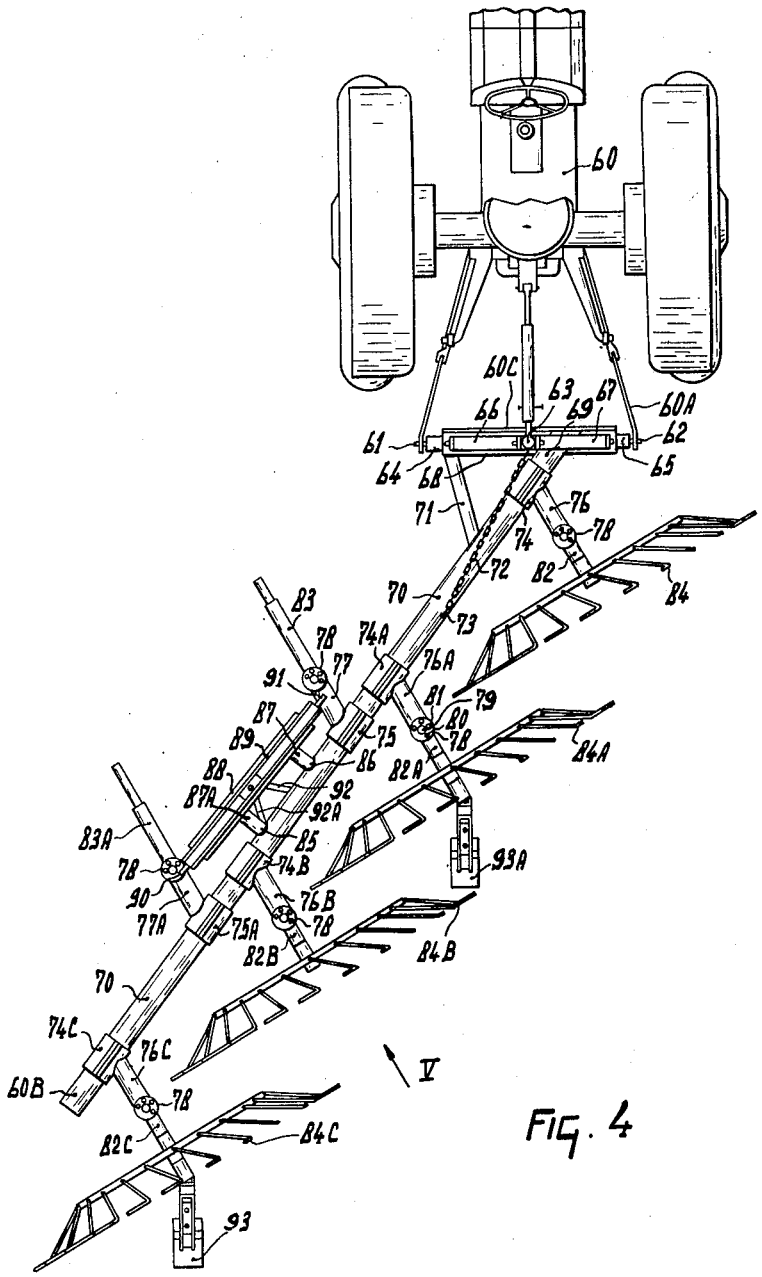
FIG. 4 shows a plan view of a modified version of the implement shown in FIG. 1, and attached to a tractor.

Referring to FIGS. 1, 2 and 3, a propelling device consisting of a tractor 1 has a rear portion 2 which is provided with a three-point lifting device 1A comprising two arms 3 which can be raised and lowered by means of the tractor engine, and three links 4, 5 and 6. The latter are pivotally secured to the rear portion 2 of the tractor, the links 4 and 5 being substantially co-planar and being suspended from the free ends of the arms 3 by means of tie rods 7 and 8. The link 6, the length of which is adjustable by a telescopic connection with the bar 6B, is located between the links 4 and 5, but at a higher level. The length of link 6 can be secured by a pin 6A. This described construction affords a coupling device for coupling the implement to the tractor.

The implement attached to the coupling device includes a frame 8A consisting primarily of a horizontal tube 9 on which horizontal, mutually parallel, axles 13, 14 and 15 are mounted at 10, 11 and 12, respectively.

A tube 16 having an end 17 which is bent vertically downwards, is attached to the tube 9 at 18. The tubes 9 and 16 are interconnected at a distance from the point 18 by means of a short tube 19. The other end 20 of the tube 16 is connected to the adjacent end 22 of the tube 9 by means of a horizontal bar 21. The tractor forms the draft means, and links 4 and 5 form at least a part of the means of connection between the draft means and the frame.

Bar 21 carries an axle 23 which is parallel to and coplanar with the axles 13, 14 and 15. An axle 21A, having ends 24 and 25, is adjustably connected to the bar 21 in such a way that the angle which the tube 9 makes in a horizontal plane with the intended direction of travel of the implement can be altered within certain limits. Ends 24 and 25 are hinged about the free ends 26 and 27 of the links 4 and 5. Two supporting bars 28 and 29, located in the same vertical plane and extending obliquely upwards from near the ends 24 and 25, are hinged at their upper ends to the link end 30 of the coupling device and at their lower ends to the frame 8A. The bars 28 and 29 constitute a fastening device 8B for fastening the frame 8A to the lifting device 1A. A chain 31 extends from the link end 30 to a hook 55 attached near 18 to the tube 9.

Four rake wheels 32, 32A, 32B and 32C are rotatably mounted on the axles 23, 15, 14 and 13, respectively. Rake 32, which exemplies each of these rake wheels, is comprised of a hub 33 (see FIG. 2), a rim 34 and steel wires 35, each of the latter being attached at one end to the hub 33 and passing through apertures at 36 in the rim 34. On the inner side of the rim 34 the steel wires 35 are located in the plane of the rim and at an angle to a radius of the rim passing through 36. On the outer side of the rim, each steel wire is bent at 36 to form a tine 38 with a support 37 for the tine. Each tine 38 is substantially parallel to that part of the steel wire 35 which is located on the inner side of the rim 34. The supports 37 lie on a frusto-conical surface 39 (see FIG. 1). Hub 33 and the corresponding hubs for each of the rake wheels are journalled on the axles 13, 14, 15 and 23, by means of bushings 40.

Axles 13 and 15 extend through their respective bushing 40 and each carries a supporting device including further bushings 41 and 41A, respectively, the supporting device also serving for adjusting the working height of the rake wheels. A hole is bored through each of the axles 13 and 15 and the respective bushings 41 and 41A intersecting the axis of each bushing and axle. A locking pin 42 and 42A is entered in each hole. Bushing 41 carries an arm 43 having a slideable portion 44 which can be secured in a definite position by means of a locking bolt 45 and which carries at its lower end a shoe 46 having a front end 47. The shoe 46 can thus easily slide forwardly over the ground, and forms, with arm 43, portion 44, bolt 45 and bushing 41, the supporting device. It will, of course, be understood that the shoes can be replaced by ground wheels. Bushing 41A carries comparable structure with the corresponding reference characters having the letter "A" added.

Tube 16 of the frame 8A carries two aligned pins 48 and 49 which can be fixed to the link ends 26 and 27 of the coupling device. In order to change the implement from the position where it serves as a side delivery rake (see FIGS. 1 and 2), to the position where it serves as a tedder (see FIG. 3), the supporting bars 28 and 29 and the axle having the ends 24 and 25 are released from the associated link ends 30, 26, and 27, respectively. Tube 9 carries a fork 50 which can be coupled, by means of a pin 51, to the link end 30, but only if first the implement is inverted, since the fork 50 is situated at a lower level than the pins 48 and 49.

In the position where the implement serves as a tedder, bushings 41 and 41A, arms 43 and 43A, and shoes 46 and 46A must be rotated 180° in a vertical plane and with respect to the frame about the respective axles 13 and 15 from the position which they occupied in FIGS. 1 and 2. In order to effect such rotation, the pins 42 and 42A are drawn out of their respective holes, thus permitting the rotation to take place, after which the pins 42 and 42A can be re-introduced into the holes.

In the position shown in FIGS. 1 and 2 the implement is supported by the links 4 and 5 and by the shoes 46 and 46A, the frame being movable about the axis of the pins 24A and 25A carried by the ends 24 and 25. In the latter working position no force is exerted on the link 6 because the chain 31 is normally slack when the implement is in operation. The chain 31 can be easily shortened or lengthened by connecting various links of the chain to the hook 55.

When the implement serves as a side delivery rake, material on the ground is delivered to the left (see FIG. 1) during forward movement by means of the rake wheels 32, 32A, 32B and 32C. When the implement works as a tedder, each of the rake wheels 32, 32A, 32B and 32C clears the material from the narrow strip of ground. The worked strips may be very close together if the distance between the axles 13, 14, and 15 and 23 is chosen to give that result.

The links 4, 5 and 6 are independently hingeable during operation, owing to which the implement can continually adapt itself to the ground.

In the construction according to the embodiment hereinbefore described, the coupling device consists of the three-point lifting device of the tractor. If desired, the implement can be provided with a ground wheel on the side that the tractor is attached. It will be clear, in such event, that the means provided on the frame for connecting the frame to the coupling device may be different from that shown in the accompanying drawings. For example, such means may consist of a towing hook.

When the implement is coupled to the lifting device of a tractor, it may be raised by means of the lifting device. The chain 31 (see FIGS. 1 and 2) will be tensioned and will limit the angle between the frame and the supporting bars 28 and 29, whereafter the rake wheels 32, 32A, 32B, and 32C, and the shoes 46 and 46A will leave the ground so that the implement can be transported.

Referring to FIGS. 4 to 6, a coupling device 60A consisting of a three-point lifting device of a tractor 60 has three link ends 61, 62 and 63. Means are provided on the frame 60B for connection to the link ends, such means consisting of an axle having ends 64 and 65. The frame 60B is able to turn about the axle with respect to the coupling device 60C, the latter consisting also of supporting bars 66 and 67 extending obliquely upwards and hinged at their upper ends to the link end 63 and at their lower ends to an angle-section bar 68.

The bar 68 is connected to an end 69 of a tubular beam 70, the connection being reinforced by a bar 71. A chain 72 connects the link end 63 of the coupling device to a hook 73 on the beam 70.

Six two-part sleeves 74, 74A, 74B, 74C, 75 and 75A are clamped on the beam 70, the four sleeves 74, 74A, 74B, and 74C being spaced an equal distance apart. The means for clamping are not specifically shown, and any satisfactory method well known in the mechanical art may be employed for this purpose. The distances between sleeves 74, 74A, 74B, 74C, 75 and 75A can be changed as desired by simply releasing and re-clamping the sleeves in different positions.

Sleeves 74, 74A, 74B, 74C, 75 and 75A carry short arms 76, 76A, 76B, 76C, 77 and 77A, respectively, arms 76, 76A, 76B and 76C being directed away from the tractor and arms 77 and 77A being directed more towards the tractor. Arms 76, 76A, 76B, 76C, 77 and 77A are horizontal and parallel, and each carries a hinge connection 78 having a pivot 79. Each connection 78 can be secured in any one of a plurality of positions by the introduction of a pin 80 into any one of a number of holes 81 in order to fix the parts being interconnected against rotation. The connections 78 mounted on arms 76, 76A, 76B, 76C, 77 and 77A, respectively, connect said arms to horizontal axles 82, 82A, 82B, 82C, 83 and 83A, respectively. In the position shown in FIGS. 4 and 5, rake wheels 84, 84A, 84B and 84C similar to the rake wheels 32, 32A, 32B and 32C described in connection with FIGS. 1 to 3, are rotatably mounted on the axles 82, 82A, 82B and 82C.

Two short tubes 87 and 87A extend obliquely upwards, carry a bar 88, and are attached to beam 70 at 85 and 86. Beam 89, carrying pins 90 and 91, one at each end, is mounted on bar 88. Two short arms 92 and 92A are mounted on beam 70 near 85 and 86. When it is desired to change the implement from the position shown in FIGS. 4 and 5 to the position shown in FIG. 6, the connecting members are freed from the coupling device, the frame is inverted and pins 90 and 91 are hingedly connected to link ends 62 and 61, respectively, and arms 92 and 92A are hingedly connected to link end 63 of the coupling device.

In the working position shown in FIGS. 4 and 5, axles 82A and 82C passing through rake wheels 84A and 84C are each provided at their extremities with a supporting device including shoes 93 and 93A, the construction of each supporting device being similar to the supporting device described in connection with FIGS. 1, 2 and 3. In the working position shown in FIG. 6, rake wheels 84, 84A, 84B and 84C occupy approximately the same position with respect to the frame as shown in FIG. 4. However, supporting devices including shoes 93 and 93A are rotated through 180° about their respective axles 82C and 82A relative to the frame, so that shoes 93 and 93A can rest upon the ground.

In the position shown in FIGS. 4 and 5, the implement constitutes a side delivery rake, and in the position shown in FIG. 6, the implement constitutes a tedder.

By adjusting the connections 78, it is possible to adjust the positions of the rake wheels relative to the frame in each of the working positions described in connection with FIGS. 4 and 6.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

We claim:

1. A rake for laterally displacing material such as hay or other crops lying on the ground comprising a frame, an echelon of parallel overlapping rake wheels mounted on said frame, a first means for fastening the rake for side delivery, two spaced draft connecting means for connecting said frame to a draft means on said first means situated apart in a substantially horizontal plane, a second means for fastening the rake for tedding connected to said frame, two connecting means on said second means situated at a distance apart in a substantially horizontal plane, one of said connecting means being connected to one end of said frame and the other connecting means being connected to said frame intermediate the said frame ends.

2. In combination with a tractor, a side delivery rake for laterally displacing material such as hay or other crops lying on the ground comprising a frame, an echelon of parallel overlapping rake wheels mounted on said frame, a side delivery fastening means, two spaced draft connecting means for connecting said frame to a draft means on said side delivery fastening means situated at a distance apart in a substantially horizontal plane, a tedder fastening means connected to said frame, two connecting means on said tedder fastening means situated at a distance apart in a horizontal plane, said connecting means of said side delivery fastening means and said connecting means of said tedder fastening means being situated transverse to the intended direction of movement of said rake when coupled to said tractor, one of said connecting means being connected to one end of said frame and the other connecting means being connected to said frame intermediate the said frame ends.

3. A side delivery rake for laterally displacing material such as hay or other crops lying on the ground comprising a frame, an echelon of parallel overlapping rake wheels mounted on said frame, a side delivery fastening device connected to one end of said frame for attachment to the power lift mechanism of a tractor, a tedder fastening device connected to said frame intermediate its ends also for attachment to the power lift mechanism of a tractor, each of said fastening devices comprising two transversely spaced connecting points and serving to prevent movement of said frame in a lateral direction relative to the direction of movement of the device.

4. A side delivery rake as set forth in claim 3, wherein each of said fastening devices comprises a third connecting point.

5. A side delivery rake as set forth in claim 4, wherein said third connecting points for each of said fastening devices are on opposite sides of the frame.

6. A side delivery rake for laterally displacing material such as hay or other crops lying on the ground comprising a frame, an echelon of parallel overlapping rake wheels mounted on said frame, a side delivery fastening device connected to one end of said frame for attachment to the power lift mechanism of a tractor, a tedder fastening device connected to said frame intermediate its ends also for attachment to the power lift mechanism of a tractor, each of said fastening devices lying in planes which are substantially perpendicular to each other and in different angulation to the vertical planes of said rake wheels.

7. A side delivery rake for laterally displacing material such as hay or other crops lying on the ground comprising a frame, an echelon of parallel overlapping rake wheels mounted on said frame, a side delivery fastening device connected to one end of said frame for attachment to the power lift mechanism of a tractor, a tedder fastening device connected to said frame intermediate its ends also for attachment to the power lift mechanism of a tractor, each of said fastening devices comprising two transversely spaced connecting points and serving to prevent movement of said frame in a lateral direction relative to the direction of movement of the rake, each of said fastening devices lying in planes which are substantially perpendicular to each other and in different angulation to the vertical planes of said rake wheels.

8. A side delivery rake for laterally displacing material such as hay or other crops lying on the ground comprising a frame, an echelon of parallel overlapping rake wheels mounted on said frame, a side delivery fastening device connected to one end of said frame for attachment to the power lift mechanism of a tractor, a tedder fastening device connected to said frame intermediate its ends also for attachment to the power lift mechanism of a tractor, each of said fastening devices comprising two transversely spaced connecting points and serving to prevent movement of said frame in a lateral direction relative to the direction of movement of the device, said side delivery fastening means incorporating pivot means, said pivot means enabling said frame to pivot with respect to said side delivery fastening means, so as to change the obliquity of the frame to the intended direction of movement.

9. A side delivery rake for laterally displacing material such as hay or other crops lying on the ground, comprising a frame, an echelon of parallel overlapping rake wheels mounted on said frame, a side delivery fastening device connected to one end of said frame for attachment to the power lift mechanism of a tractor, a tedder fastening device connected to said frame intermediate its ends also for attachment to the power lift mechanism of a tractor, each of said fastening devices comprising two transversely spaced connecting points and serving to prevent movement of said frame in a lateral direction relative to the direction of movement of the device, said frame consisting of inter-connected frame beams forming a substantially flat structure.

10. A side delivery rake as set forth in claim 9, wherein the frame is provided with supports for said rake wheels, axle means on said supports, said axle means lying on the same level as said flat frame, said rake wheels being freely rotatably mounted on said axle means.

References Cited in the file of this patent

UNITED STATES PATENTS

| | | |
|---|---|---|
| 720,098 | Bamford | Feb. 10, 1903 |
| 740,911 | Peto | Oct. 6, 1903 |
| 2,621,466 | Kopp | Dec. 16, 1952 |
| 2,811,009 | Plant | Oct. 29, 1957 |

FOREIGN PATENTS

| | | |
|---|---|---|
| 531,552 | Belgium | Sept. 30, 1954 |
| 532,560 | Belgium | Oct. 30, 1954 |